(12) United States Patent
Clifton

(10) Patent No.: US 7,509,363 B2
(45) Date of Patent: Mar. 24, 2009

(54) METHOD AND SYSTEM FOR APPROXIMATING SINE AND COSINE FUNCTIONS

(75) Inventor: Daniel B. Clifton, Rockledge, FL (US)

(73) Assignee: ATI Technologies ULC, Markham, Ontario (CA)

( * ) Notice: Subject to any disclaimer, the term of this patent is extended or adjusted under 35 U.S.C. 154(b) by 815 days.

(21) Appl. No.: 10/987,487

(22) Filed: Nov. 12, 2004

(65) Prior Publication Data

US 2005/0071401 A1    Mar. 31, 2005

Related U.S. Application Data

(63) Continuation-in-part of application No. 09/918,346, filed on Jul. 30, 2001, now Pat. No. 6,976,043.

(51) Int. Cl.
*G06F 1/02* (2006.01)
(52) U.S. Cl. .................. 708/277; 708/272; 708/276
(58) Field of Classification Search .......... 708/270–277
See application file for complete search history.

(56) References Cited

U.S. PATENT DOCUMENTS

| | | | |
|---|---|---|---|
| 4,583,188 | A | 4/1986 | Cann et al. |
| 5,041,999 | A | 8/1991 | Nakayama |
| 5,068,816 | A | 11/1991 | Noetzel |
| 5,831,878 | A | 11/1998 | Ishida |
| 5,951,629 | A | 9/1999 | Wertheim et al. |
| 6,115,726 | A | 9/2000 | Ignjatovic |
| 6,240,433 | B1 | 5/2001 | Schmookler et al. |
| 6,373,535 | B1 | 4/2002 | Shim et al. |
| 6,711,601 | B2 | 3/2004 | Inoue et al. |

*Primary Examiner*—Tan V Mai
(74) *Attorney, Agent, or Firm*—Vedder Price P.C.

(57) ABSTRACT

A technique for approximating output values of a function based on LaGrange polynomials is provided. Factorization of a LaGrange polynomial results in a simplified representation of the LaGrange polynomial. With this simplified representation, an output value of a function may be determined based on an input value comprising a fixed point input mantissa and an input exponent. Based on a first portion of the fixed point input mantissa, a point value and at least one slope value are provided. At least one slope value is based on a LaGrange polynomial approximation of the function. Thereafter, the point value and the at least one slope value are combined with a second portion of the fixed point input mantissa to provide an output mantissa. Based on this technique, a single set of relatively simple hardware elements may be used to implement a variety of functions with high precision.

27 Claims, 13 Drawing Sheets

- PRIOR ART -

- PRIOR ART -

FIG. 3 - PRIOR ART -

METHOD AND SYSTEM FOR APPROXIMATING SINE AND COSINE FUNCTIONS

RELATED CO-PENDING APPLICATION

This is a Continuation-In-Part of application Ser. No. 09/918,346, entitled TECHNIQUE FOR APPROXIMATING FUNCTIONS BASED ON LAGRANGE POLYNOMIALS having inventor David B. Clifton, an a filing date of Jul. 30, 2001 now U.S. Pat. No. 6,976,043, owned by instant assignee and herein incorporated by reference.

TECHNICAL FIELD OF THE INVENTION

The present invention generally relates to computation devices that calculate the value of a function using hardware-implemented approximation techniques and, in particular, a technique for calculating such approximations based on LaGrange polynomials.

BACKGROUND OF THE INVENTION

Computation devices that perform arithmetic operations are well known in the art. In order to perform such operations, these computation devices typically comprise an arithmetic logic unit or the like. The arithmetic logic unit or, as it is sometimes referred to, a math engine, implements circuitry in hardware used to perform separate arithmetic functions. Such functions range from relatively simple operations such as addition and multiplication to more complex operations such as producing/figuring exponents, logarithms, inverses and the like. While a variety of techniques exist in the prior art for approximating the values of more complex functions, a technique that is often used relies on tables of point values and slope values to approximate the output value of a function.

Referring to FIGS. 1-3, there is illustrated an example of the use of point and slope values to approximate the output value of a function. Referring to FIG. 1, an arbitrary function 102 is illustrated as a continuous line. For each of a plurality of known, discrete input values, labeled $x_0$ through $x_p$, there are corresponding known output values, labeled $f(x_0)$ through $f(x_p)$. The discrete input values are often referred to as points, whereas the output values are referred to as point values. Furthermore, linear approximations of the function between the point values are referenced in terms of slopes. This is further illustrated in FIG. 2.

In FIG. 2, a plurality of point values labeled $x_j$, $x_{j+1}$ and $x_{j+2}$, and their corresponding output values $f(x_j)$, $f(x_{j+1})$ and $f(x_{j+2})$ according to an arbitrary function 202 are shown. Between each of the points, piecewise linear approximations 204, 206 of the curve 202 are also shown. Each of the linear approximations 204, 206 is characterized by a slope, m, according to well known geometry principles. When attempting to approximate the output value, $f(x)$, for an arbitrary input, x, it is first determined which point the input value x is closest to. In the example illustrated in FIG. 2, the input value x falls between the points $x_j$ and $x_{j+1}$. In particular, the input value, x, differs from the point, $x_j$, by value, $\Delta x$, as illustrated. Using the well known equation for a line, the approximated (or estimated) output value, $f'(x)$, corresponding to the input value, x, may be calculated according to the equation:

$$f'(x) = f(x_j) + m\Delta x \quad \text{(Eq. 1)}$$

The difference between the estimated output value, $f'(x)$, and the true output value, $f(x)$, as shown in FIG. 2, is the error that results from the approximation nature of the method illustrated in FIG. 2. Assuming that a sufficient number of points and point values are used, the error resulting from the above-described method can be kept relatively small, while still maintaining the relative ease of implementation of this method. A technique for implementing this method is further illustrated with respect to FIG. 3.

The technique previously described with respect to FIG. 2 may be implemented using a point table 302, a slope table 304, a multiplier 306 and an adder 308. The implementation illustrated in FIG. 3 operates upon input values represented as a signed mantissa and an exponent value. Equation 2 below illustrates a signed mantissa and exponent, base-2 representation, i.e., binary.

$$X \text{ or Numerical Value} = (+/-)\text{Mantissa} \times 2^{Exponent} \quad \text{(Eq. 2)}$$

In essence, the mantissa represents the significant digits of a value and the exponent value represents a relative magnitude of the significant digits. A sign bit labeled S in the figures, indicates whether the mantissa value is positive or negative. In this manner, a very large range of values may be represented depending on the number of bits used. The mantissa, for example x, may be further divided into a first portion, labeled $x_0$, and a second portion, labeled $\Delta x$. As shown, the first portion $x_0$ comprises the most significant bits of the mantissa and defines the points as previously described. For example, if the first portion $x_0$ comprises the five most significant binary bits, there are 32 points available. The remaining least significant digits define the second portion illustrated as $\Delta x$ in FIG. 3. In implementing Equation 1, the first portion of the mantissa, or point, is used to reference the point table 302 to provide a corresponding point value, $f(x_0)$. Likewise, the first portion of the mantissa is also used to index the slope table 304 to provide a corresponding slope value, m. The values in the point tables 302 and the corresponding values in the slope tables 304 are constants defined according to the equation being approximated. Furthermore, the values in the point table 302 and slope table 304 are defined over a limited range for which the approximation is valid. As shown, the resulting slope value, m, is multiplied by the value of the second portion of the mantissa, $\Delta x$, by the multiplier 306 and the resulting product is added to the point value, $f(x_0)$, by the adder 308. The output of the adder 308 is the mantissa of the output of the function.

Additionally, sign/exponent processing 310 is performed on the input value sign, s, and exponent in order to provide the output value sign and exponent, as shown in FIG. 3. The particular processing implemented by the sign/exponent processing block 310 depends upon the representation of the exponent as well as the particular function being approximated. For example, in order to avoid negative exponent values, it is a common practice to add an offset or bias to the exponent value equivalent to a mid-point of the range of values that may be represented by the exponent. Thus, if 8 bits are used to represent exponents, an offset of 128 will prevent any negative exponent values. This is illustrated in Table 1 below.

TABLE 1

| Exponent Without Offset | Exponent With Offset |
| --- | --- |
| −128 | 0 |
| 0 | 128 |
| 128 | 256 |

In order to operate upon the exponent, it therefore becomes necessary to first remove the offset when processing the exponent and, when processing is completed, to add the offset value once again. Additionally, the nature of the function being approximated affects the processing of the exponent. For example, where an inverse function is being implemented, processing of the true value of the exponent can be as simple as inverting each binary bit of the biased exponent value and then subtracting two (one if the input is an exact multiple of 2.0). In another example, implementation of a square root function requires subtracting the biased exponent value from 381 (383 if the input is an exact multiple of 4.0), then dividing by two. A third example would be the logarithm function where the input exponent is simply unbiased and concatenated as an integer value to the fixed point fractional mantissa result. Such sign and exponent processing is well known to those having ordinary skill in the art.

Regardless, as can be seen in FIG. 3, the implementation of this technique is relatively simple, requiring only two tables 302, 304, a multiplier 306 and an adder 308. However, the precision obtained by this technique is limited by the number of values stored in the point table 302 and the slope table 304. That is, greater precision is gained only by significantly enlarging the overall size of the point table 302 and the slope table 304. In some instances, the required precision may lead to a prohibitively large set of tables. For example, the so-called DirectX8 standard calls for up to 22 bits of precision when calculating reciprocal values and reciprocal square root values. The size of the tables required to achieve this level of precision using the implementation shown in FIG. 3 would be prohibitively large. Therefore, a need exists for a technique that provides the necessary precision when approximating arithmetic functions, and that is relatively simple to implement.

The DirectX9 standard typically provides a maximum absolute error equivalent to only 9 to 10 bits of precision when calculating sine and cosine function values. Further, the DirectX9 standard, if implemented in software, typically requires 8 instructions to calculate sine and cosine function values. Since a pipelined hardware implementation of the DirectX9 standard may require up to four twenty-four bit hardware multipliers, such an implementation would be relatively expensive and, therefore, costly to implement. Additionally, the size of the tables required to achieve this level of precision using the implementation shown in FIG. 3 would be prohibitively large.

According to another known technique, the Taylor series approximation may be implemented to produce the sine and cosine functions. However, to provide a high level of precision, such as 8 or 9 bits of precision, a large amount of processing resources is required to implement the Taylor series approximations.

According to another technique, a floating point argument of a function addresses a floating point interpolating memory. A memory and a decoder produce coefficients in response to a floating point exponent. A polynomial evaluator produces a floating point representation of the evaluated function. However, since the floating point argument addresses the memory, additional computations are required in order to convert the floating point argument into a value for addressing the memory. As a result, additional processing and additional complexity are required, resulting in increased cost and/or increased delay in processing and evaluating the polynomial.

DETAILED DESCRIPTION OF THE PREFERRED EMBODIMENT

The present invention provides a technique for approximating output values of a function based on LaGrange polynomials. More particularly, the present invention takes advantage of the superior accuracy of LaGrange polynomials using a hardware implementation that requires substantially less circuitry that would otherwise be required to directly implement a LaGrange polynomial. To this end, the present invention relies on a factorization of a LaGrange polynomial that results in a representation of the LaGrange polynomial requiring substantially less hardware and a relatively modest amount of memory to implement tables.

With this simplified representation, an output value of a function may be determined based on an input value comprising an input mantissa and an input exponent. Based on a first portion of the input mantissa, a point value is provided. Additionally, at least one slope value based on the first portion of the input mantissa is also provided. Each of the at least one slope value is based on a LaGrange polynomial approximation of the function. Thereafter, the point value and the at least one slope value are combined with a second portion of the input mantissa to provide an output mantissa. Likewise, conventional techniques for processing an exponent value are used to process the input exponent value. In a preferred embodiment, where an exponential, sine or cosine function is being implemented, the input mantissa is first converted to fixed point format such that the input value falls within a valid range of the function. Otherwise, the input mantissa is taken in unchanged, but treated like a fixed point value within the valid range of the function. Based on this technique, a single set of hardware may be used to implement a variety of functions such as a reciprocal function, a reciprocal square root function, an exponential function and a logarithmic function.

Furthermore, relatively high precision is achievable using a relatively simple hardware embodiment. This technique may be implemented in a variety of computing platforms and, in particular, in a graphics processing circuit.

Figure 4:
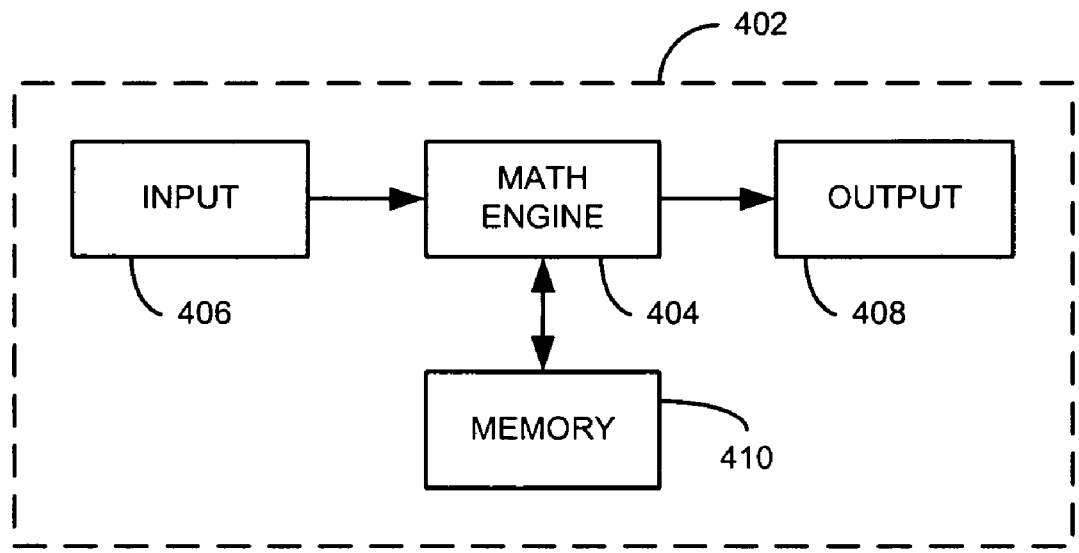
FIG. 4 is a block diagram of a graphics processing circuit in accordance with one embodiment of the present invention.

The present invention may be more fully described with reference to FIGS. 4-7. Referring now to FIG. 4, there is illustrated a graphics processing circuit 402 comprising a math engine 404 coupled to an input 406, an output 408 and a memory 410. As is known in the art, the graphics processing circuit 402 may comprise a large-scale integrated circuit capable of operating upon input data, based on a stored or fixed set of instructions, to provide output data. For example, the graphics processing circuit 402 may be embodied by a dedicated graphics processing chip, a microprocessor or any other similar device that would benefit from an improved technique for approximating the value of arithmetic functions. Likewise, the present invention may be incorporated into any computing device that performs arithmetic functions. An example of a suitable circuit that may benefit from the present invention is the "RADEON" family of graphics processor and its successors by ATI Technologies, Inc. The math engine 404 comprises the circuitry used to implement arithmetic functions. Data to be operated upon by the math engine 404 is provided by an input 406 and, subsequent to operation by the math engine upon such data, provided to an output 408. The input and output blocks 406, 408 may be used, as is known in the art, to condition and store the data to insure the smooth flow of data through the math engine 404. The memory 410, in addition to storing variables used by the math engine 404, also stores tables of constants used by the math engine 404 when implementing the arithmetic functions. Alternatively, such tables used to implement the arithmetic functions may be integral to the math engine 404 itself. Regardless, the present invention is preferably implemented by the math engine 404 as described in greater detail below.

Figure 5:
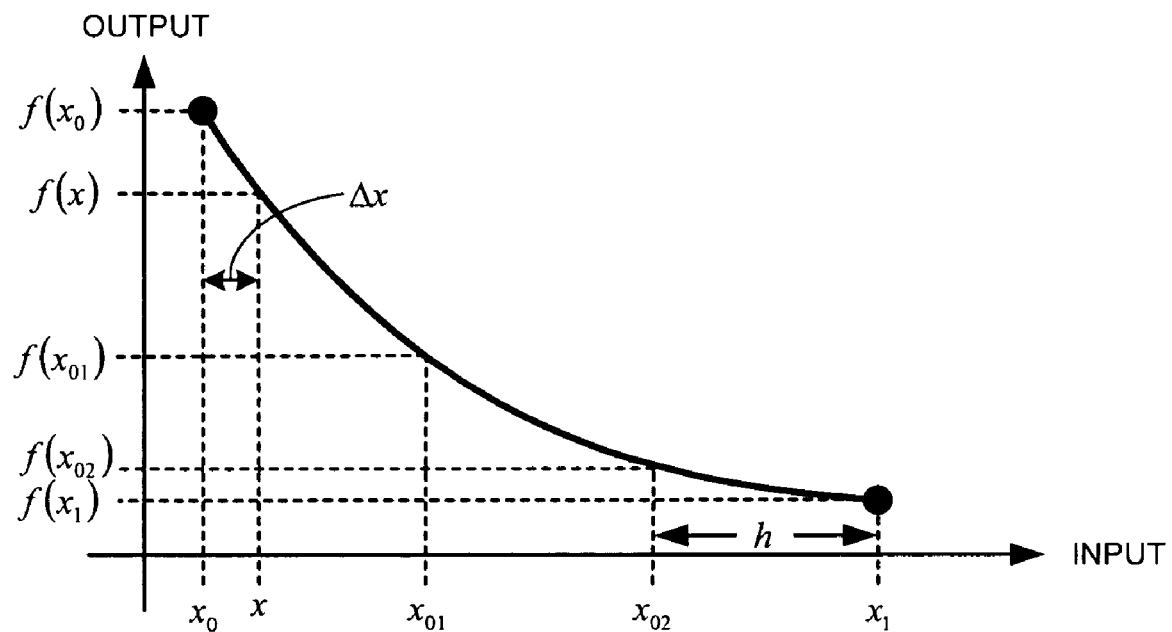
FIG. 5 is a plot illustrating a technique for approximating the value of a function in accordance with one embodiment of the present invention.

Referring now to FIG. 5, a technique for approximating the output value of a function based on LaGrange polynomial is illustrated. A general form of a LaGrange polynomial is illustrated in Equation 3 below.

$$\hat{f}(x) = \sum_{k=0}^{n-1} \prod_{\substack{j=0 \\ j \neq k}}^{n-1} \frac{(x - x_1)}{(x_k - x_j)} f(x_k) \quad \text{(Eq. 3)}$$

In general, LaGrange polynomials offer a technique for interpolating (i.e., approximating) an output value of a function, $f(x)$, based on a set of known input and output values. This is illustrated in FIG. 5. A first point, $x_0$, a second point, $x_1$, sub-points, $x_{01}$ and $x_{02}$, corresponding to the first point, and their corresponding output values, $f(x_0)$, $f(x_{01})$, $f((x_{02})$ and $f(x_1)$, are illustrated. In effect, the sub-points, $x_{01}$ and $x_{02}$, and the second point, $x_1$, provide additional information, in addition to the first point and first point value, whereby the output value for an unknown input value x may be more accurately estimated. Each of the sub-points is separated from the other sub-points and points by a step size, h, such that the sub-points are equally distributed along the curve between the first point, $x_0$, and the second point, $x_1$. Assuming that the value of each point and its corresponding sub-points, as well as their corresponding output values are known, Equation 3 could be directly implemented to determine an estimate of an output value of a function. For example, Equation 4 illustrates a third-order LaGrange polynomial corresponding to FIG. 5.

$$P(x) = f(x_0)L_0(x) + f(x_{01})L_1(x) + f(x_{02})L_2(x) + f(x_1)L_1(x) \quad \text{(Eq. 4)}$$
$$\hat{f}(x) = f(x_0)\left[\frac{(x - x_{01})(x - x_{02})(x - x_1)}{(x_0 - x_{01})(x_0 - x_{02})(x_0 - x_1)}\right] +$$
$$f(x_{01})\left[\frac{(x - x_0)(x - x_{02})(x - x_1)}{(x_{01} - x_0)(x_{01} - x_{02})(x_{01} - x_1)}\right] +$$
$$f(x_{02})\left[\frac{(x - x_0)(x - x_{01})(x - x_1)}{(x_{02} - x_0)(x_{02} - x_{01})(x_{02} - x_1)}\right] +$$
$$f(x_1)\left[\frac{(x - x_0)(x - x_{01})(x - x_{02})}{(x_1 - x_0)(x_1 - x_{01})(x_1 - x_{02})}\right]$$

Simple inspection, however, of Equation 4 makes it clear that a substantial number of multiplications and additions would be require to directly implement a third-order LaGrange polynomial. In order to simplify the implementation of Equation 4, equivalent values for the sub-points, $x_{01}$, $x_{02}$ and $x_1$, illustrated in Equations 5-7, are substituted into Equation 4, which is subsequently expanded.

$$x_{01} = x_0 + h \quad \text{(Eq. 5)}$$

$$x_{02} = x_0 + 2h \quad \text{(Eq. 6)}$$

$$x_1 = x_0 + 3h \quad \text{(Eq. 7)}$$

Figure 1:
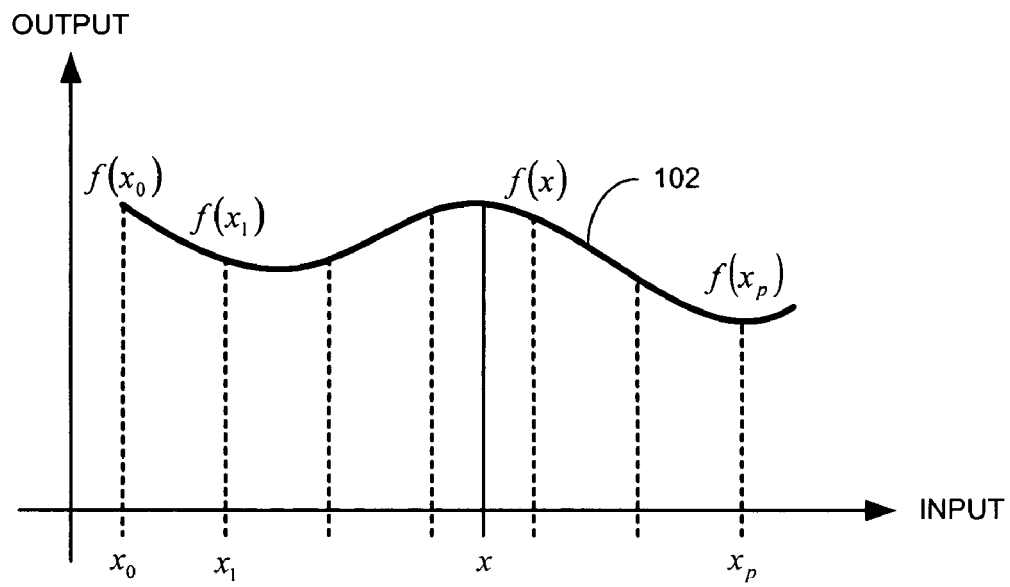
FIGS. 1-3 illustrate a technique for approximating the value of a function in accordance with prior art techniques.
Figure 2:
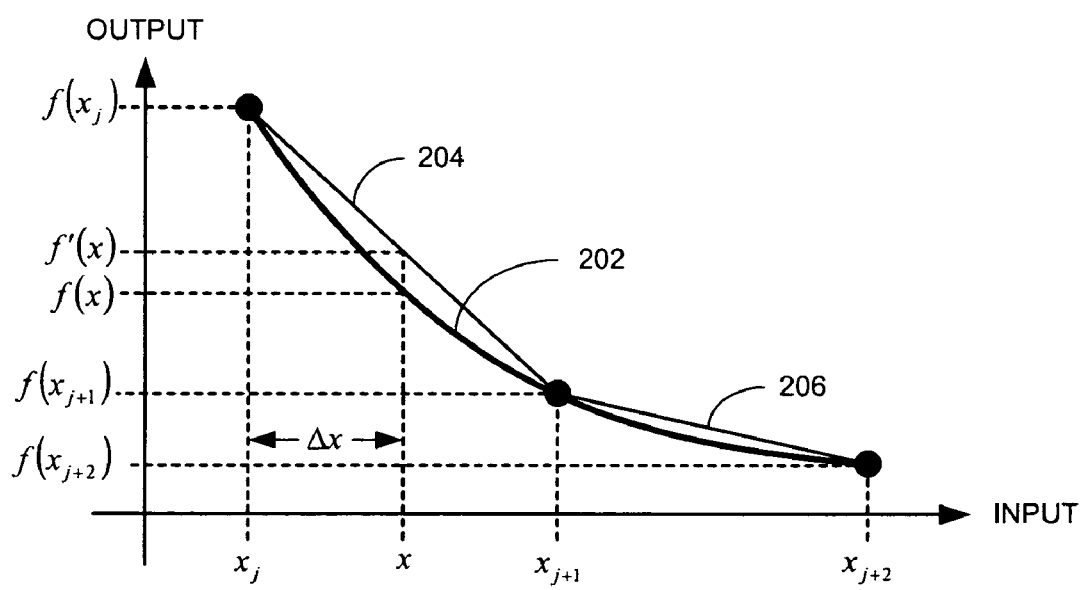
Figure 3:
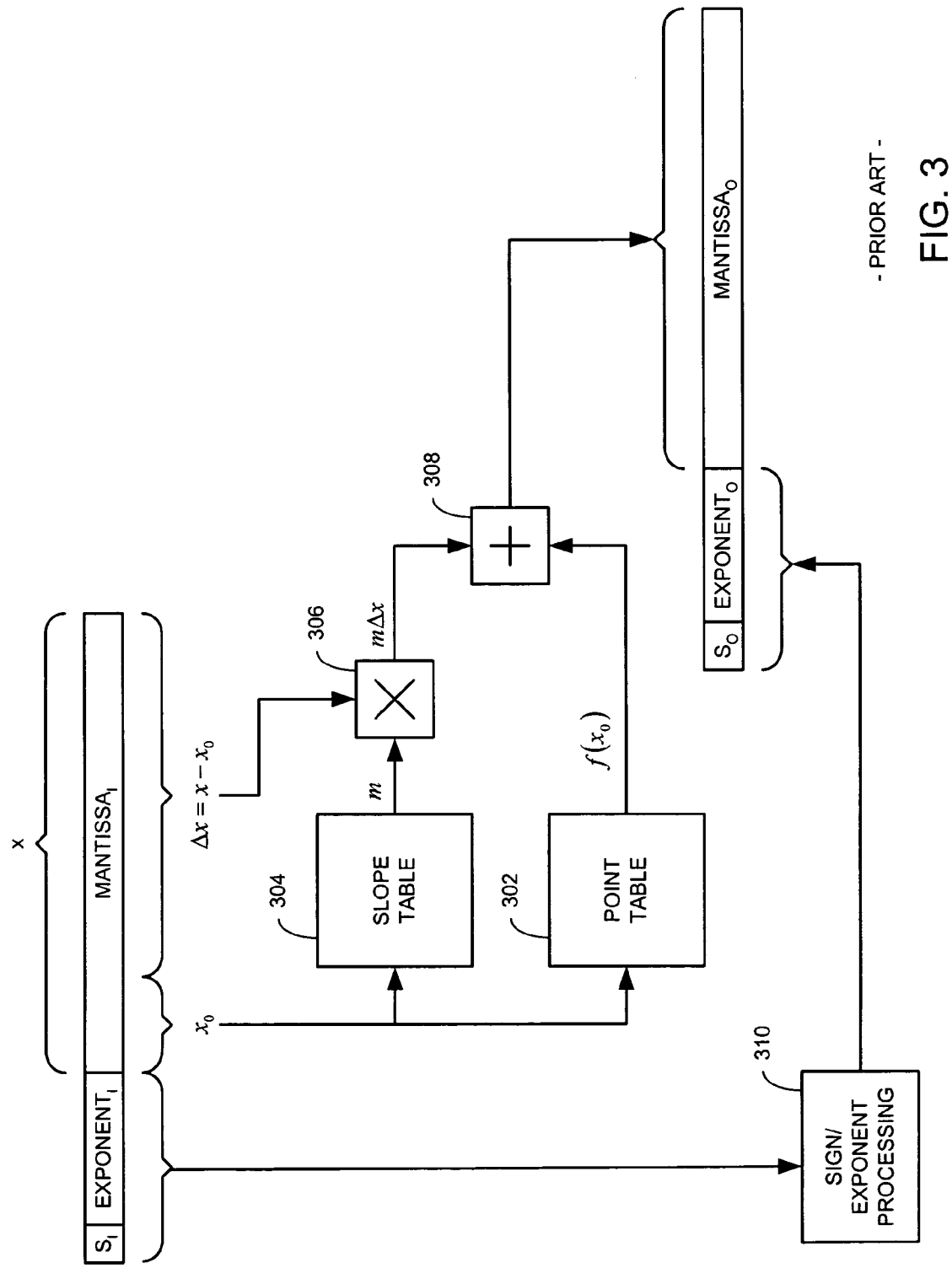

The resulting third-order equation is thereafter factored for successive powers of the quantity $(x-x_0)$, i.e., 1, $(x-x_0)$, $(x-x_0)^2$ and $(x-x_0)^3$. For ease of illustration, it is noted that $\Delta x = x - x_0$, as illustrated in FIG. 3. Through this process of factorization, the relatively complex implementation of Equation 4 can be reduced to a factored third-order LaGrange polynomial, as illustrated in Equation 8.

$$\hat{f}(x) = \sum_{i=0}^{n-1} a_i(\Delta x)^i \quad \text{(Eq. 8)}$$
$$= f(x_0) + a_1(x - x_0) + a_2(x - x_0)^2 + a_3(x - x_0)^3$$
$$= f(x_0) + a_1\Delta x + a_2(\Delta x)^2 + a_3(\Delta x)^3$$

As shown in Equation 8, the approximation reduces to a series of constant values multiplied by successive powers of the quantity $\Delta x$. The particular values for the constants $a_0$ through $a_3$, illustrated in Equation 8 for a third-order LaGrange polynomial, are shown in Equations 9-12 below.

$$a_0 = f(x_0) \quad \text{(Eq. 9)}$$

$$a_1 = \frac{1}{3h}[-5.5f(x_0) + 9f(x_{01}) - 4.5f(x_{02}) + f(x_1)] \quad \text{(Eq. 10)}$$

$$a_2 = \frac{1}{9h^2}[9f(x_0) - 22.5f(x_{01}) + 18f(x_{02}) - 4.5f(x_1)] \quad \text{(Eq. 11)}$$

$$a_3 = \frac{1}{27h^3}[-4.5f(x_0) + 13.5f(x_{01}) - 13.5f(x_{02}) + 4.5f(x_1)] \quad \text{(Eq. 12)}$$

Recall that the point values (i.e., $f(x_0)$, $f(x_1)$ and $f(x_{01})$) corresponding to the point and sub-points are known values and are dependent upon the particular function being implemented. As a result of this simplification, Equation 8 may be implemented in a relatively straight forward fashion, as is further illustrated in FIGS. 6 and 7.

Figure 6:
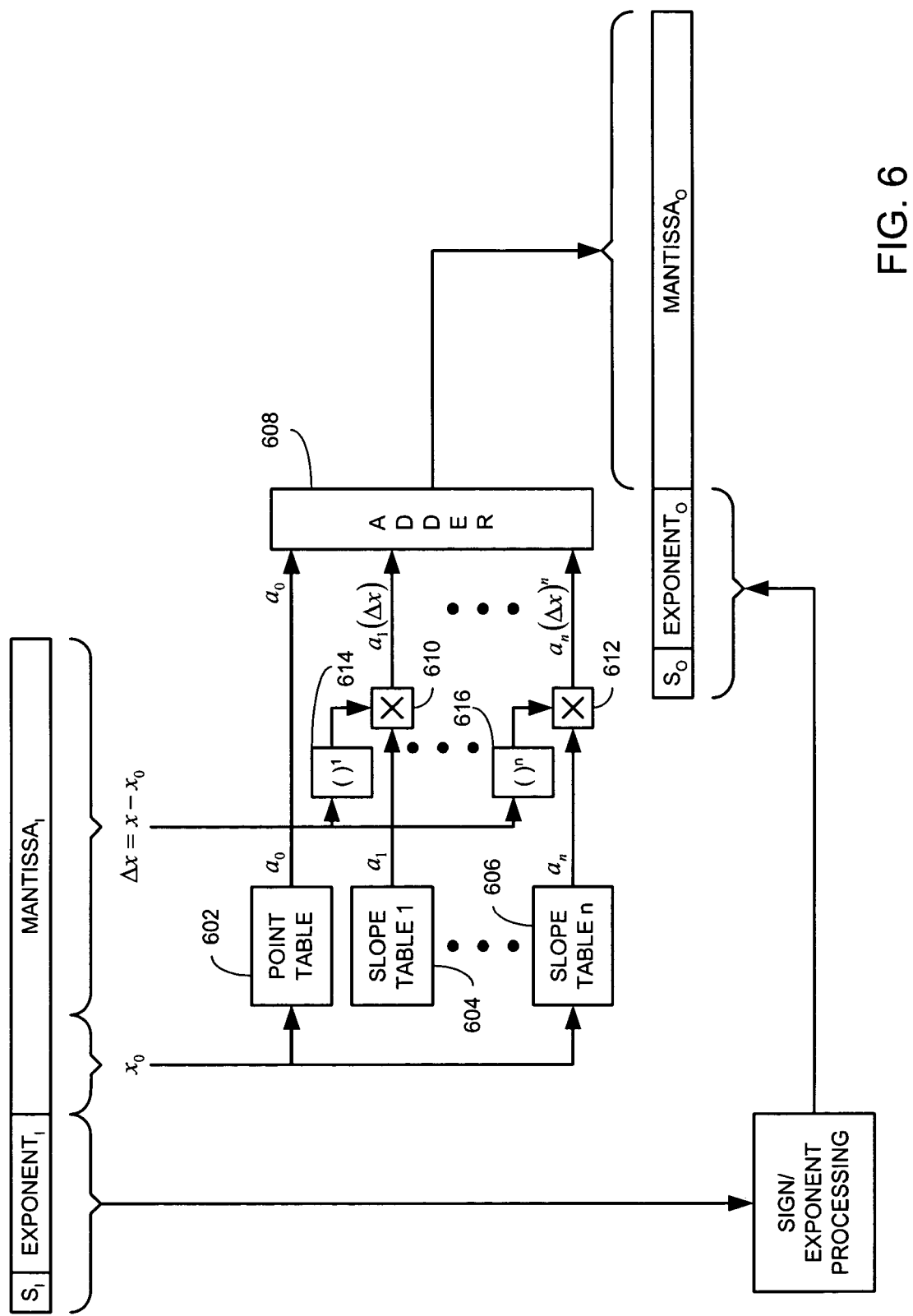
FIG. 6 is a block diagram illustrating a generalized technique for approximating function values in accordance with one embodiment of the present invention.

Referring now to FIG. 6, a generalized implementation of an nth-order LaGrange polynomial in accordance with the present invention is shown. A first portion of the input mantissa, corresponding to a point, $x_0$, is used to index a point table 602 and a plurality of slope tables 604, 606. Each of the tables 602-606 stores a value uniquely corresponding to each possible value of the first portion of the mantissa, i.e., to each point. Based on the value of the first portion, the constants $a_0$ through $a_n$ are provided by the tables 602-606. Thereafter, multipliers 610-612 are used to multiply the constant values by successive powers of $\Delta x$, provided by exponential functions 614-616, as shown. An adder 608 thereafter calculates the sum of the outputs of the multiplier 610-612 as well as the output of the point table 602. The resulting sum output by the adder 608 is the mantissa of the output value, according to the function being implemented. The sign and exponent processing is handled in a manner equivalent to that previously described.

Figure 7:
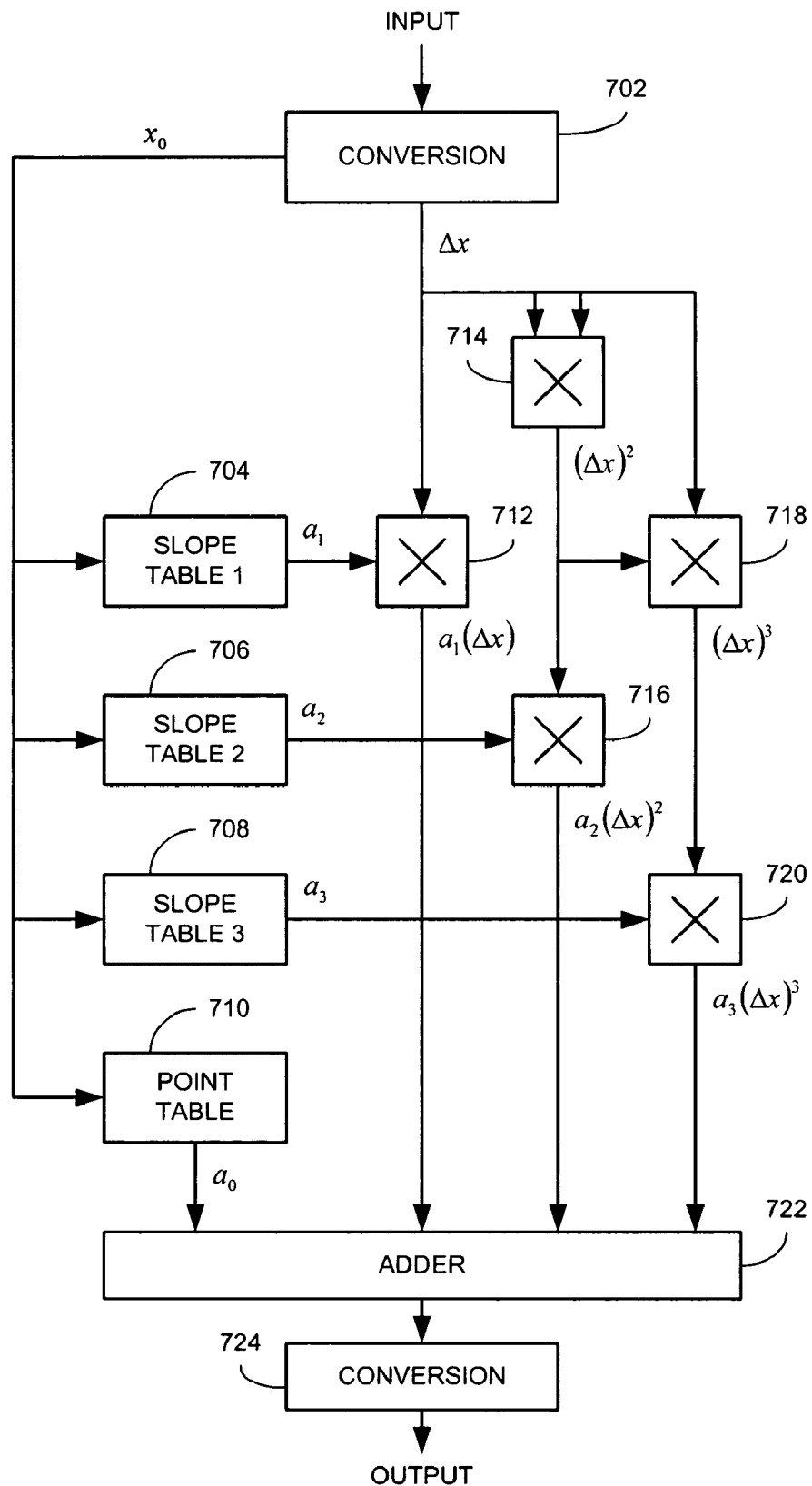
FIG. 7 is a block diagram of a preferred implementation of the present invention based on a third-order LaGrange polynomial.

Referring now to FIG. 7, a preferred embodiment based on a third-order LaGrange polynomial is illustrated. Note that FIG. 7, for ease of illustration, does not show any sign or exponent processing. Where an exponential, sine, or cosine function is being implemented, input mantissas are first provided to a float-to-fixed conversion circuit 702, as is known in the art, which ensures that the input mantissas fall within a predefined valid range for the function being implemented. For example, if this valid range is from 0 to $\pi/4$ and the exponent is $-1$, then x is not modified. If the exponent is $-2$ (FD Hex), then the most significant bit (MSB) of the fixed point representation is moved to the second binary position. Similarly, if the exponent is $-3$ (FC Hex), then the MSB of the fixed point representation is moved to the third binary position, and so on. The input mantissas for other functions such as the logarithm, reciprocal, and reciprocal square root do not require a float-to-fixed conversion and are considered to always be within the valid range since the mantissa and exponent terms can be processed separately. Such valid input ranges are a matter of design choice, and may be chosen arbitrarily depending on the particular application. For example, a valid range for an exponent function may be between 1 and 2; a valid range for a logarithmic function may be between 2 and 4; a valid range for a reciprocal function may be between 1 and 2; and a valid range for a reciprocal square root function may be between 2 and 8.

The first portion of the input mantissa, $x_0$, is used to index the tables 704-710 to provide the corresponding constant values. Likewise, the second portion of the input mantissa, $\Delta x$, is provided as an input to the multipliers, having reference numerals 712, 714, 718. Multiplier 712 multiplies the first constant, $a_1$, with a first-order power of $\Delta x$, as shown. Multiplier 714 provides a second-order power of $\Delta x$, which is thereafter multiplied by the second constant value, $a_2$, by multiplier 716, as shown. The output of multiplier 714 is also provided as an input to multiplier 718 which, in turn, provides a third-order power of $\Delta x$. The third-order power of $\Delta x$ is thereafter multiplied by the third constant, $a_3$, by multiplier 720. The resulting products are provided to an adder 722 along with the point value, $a_0$, to provide a sum representative of the mantissa of the approximated output value. The output of the adder 722 is thereafter concatenated to the unbiased input exponent and provided to a fixed-to-float conversion circuit 724, which converts the fixed point value to floating point format using known techniques. Preferably, this conversion to floating point format is used only if the function being implemented is the logarithmic, sine or cosine function and the final result is desired to be in floating point format.

The present invention overcomes the limitations of prior art techniques by providing a relatively inexpensive implementation of LaGrange polynomials while simultaneously providing substantially similar or better accuracy than these prior art techniques. For example, the implementation of the third-order LaGrange polynomial illustrated in FIG. 7 is capable of providing up to 23 bits of precision for reciprocal, square root functions, exponential, sine, cosine and logarithmic functions within the valid ranges for these functions. In such an implementation, for each function implemented, the point table 710 comprises 32 point values of at least 24 bits of accuracy; the first slope table 704 comprises 32 constant values of at least 20 bits of accuracy; the second slope table 706 comprises 32 constant values of at least 16 bits of accuracy; and the third slope table 708 comprises 32 constant values of at least 12 bits of accuracy. Likewise, the first multiplier 712 comprises a 20-bit multiplier; the second and third multipliers 714, 716 comprise 16-bit multipliers; the fourth and fifth multipliers 718, 720 comprise 12-bit multipliers; and the adder 722 comprises a 26-bit adder.

Of equal importance, the hardware implementation illustrated in FIG. 7 may be reused to implement different functions simply by substituting different tables for the point and slope value tables. In this manner, the present invention provides a highly flexible and efficient technique for implementing arithmetic functions.

The present invention substantially overcomes the limitations of prior art techniques for approximating function output values. To this end, a simplified form of LaGrange polynomials is used, providing greater accuracy for a variety of functions using a single set of implementation hardware. As a result, a cost benefit is realized because different functions may be implemented using the same hardware, while still achieving the same or better accuracy.

Figure 8:
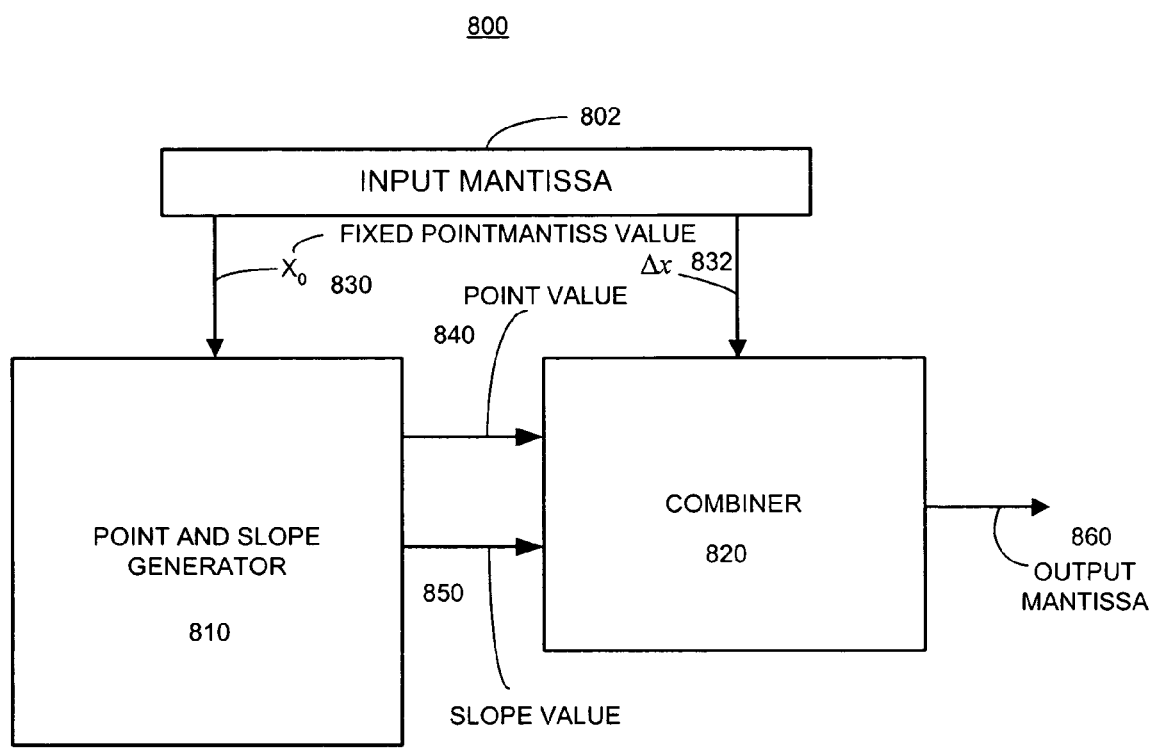
FIG. 8 is a block diagram of an apparatus for calculating the sine and cosine in accordance with one embodiment of the invention.

FIG. 8 is a block diagram of an apparatus 800 for computing a sine and/or cosine function based on a third-order LaGrange polynomial approximation according to one embodiment of the invention. The apparatus 800 includes a point and slope generator 810 and a combiner 820. The point and slope generator 810 receives data representing a fixed point mantissa value 830 and, in response, produces data representing one or more point values 840 and one or more slope values 850. The combiner 820 receives data representing $\Delta x$ 832, the one or more point values 840 and one or more slope values 850 and, in response, produces data representing an output mantissa value 860. The output data representing mantissa value 860 may be in a fixed point format, or alternatively, the combiner 820 may provide the output mantissa value 860 in a floating point format. The point and slope generator 810 and the combiner may be embodied by a graphics coprocessor, one or more processors discrete circuitry or any other suitable device executing instructions 900 stored in memory, such as memory 410, or alternatively dedicated hardware, software or any combination thereof.

Figure 9:
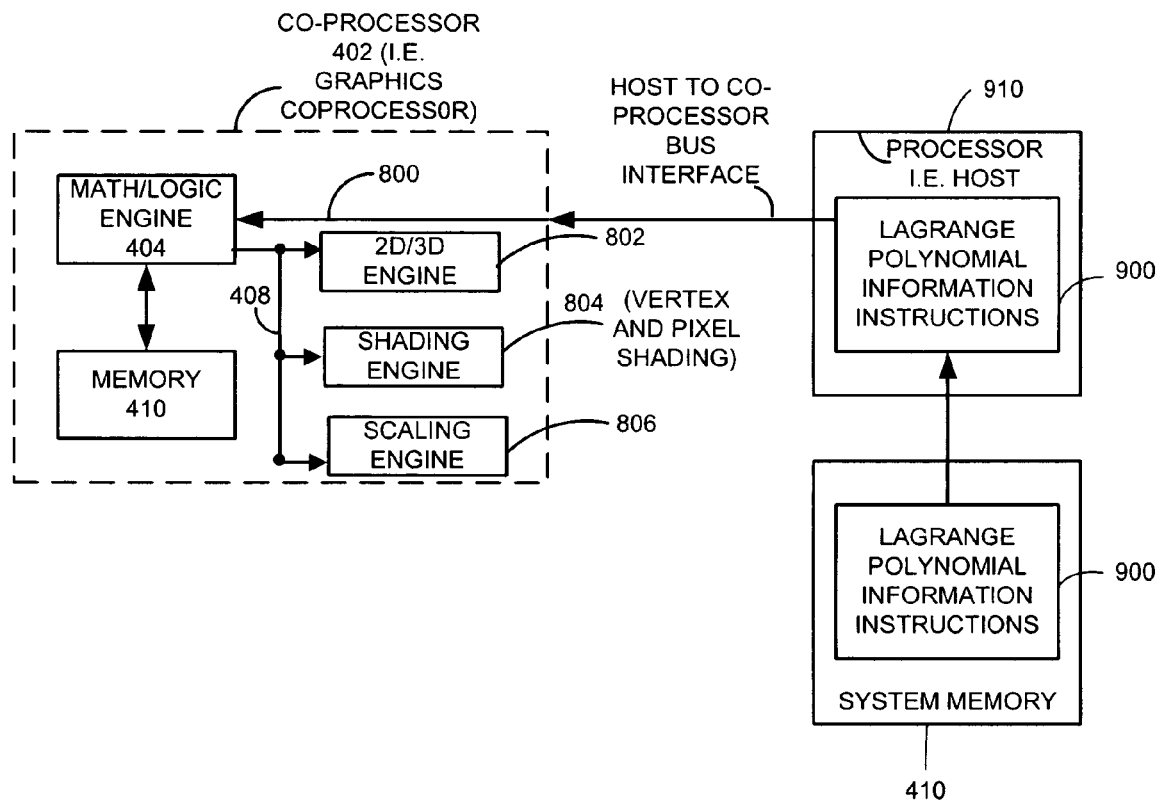
FIG. 9 is a block diagram of an apparatus to approximate a sine and/or cosine function in accordance with one embodiment of the present invention.

As shown in FIG. 9, the graphics processing circuit 402 includes the math/logic engine 404 coupled to a processor 910 via a host-to-coprocessor interface 800 and memory 410. As is known in the art, the graphics processing circuit 402 may comprise a large-scale integrated circuit such as an application-specific integrated circuit (ASIC) or any suitable integrated circuit capable of operating upon input data, based on a stored or fixed set of instructions, to provide output data. Memory 410 may include RAM, ROM or any suitable memory. According to one embodiment, the variables are stored in RAM and the tables are stored in ROM. Alternatively, such tables used to implement the arithmetic functions may be integral to the math/logic engine 404 itself.

The graphics processing circuit 402 may be embodied by a dedicated graphics coprocessing chip, one or more processors such as a host processor or any other similar device that would benefit from an improved technique for approximating the value of arithmetic functions. An example of a suitable circuit that may benefit from the present invention is the "RADEON" family of graphics processors and its successors by ATI Technologies, Inc. According to one embodiment, the present invention may be incorporated into any computing device such as a host processor executing a software application or driver or any suitable circuit that performs arithmetic functions.

The math/logic engine 404 comprises the circuitry used to implement arithmetic functions such as, for example, a scalar engine, 2D engine, 3D engine or a programmable shader engine as is known in the art. For example, the sine and/or cosine function may be used to calculate the shading applied to an object in response to a light source. For example, a shading engine may include a vertex and a pixel shader to support 2D operations such as block moves in a screen or MPEG motion compensation during playback. Alternatively, the math engine may compute the contents required rather than store and recall them in tables within memory 410.

It will be recognized that all or some of the disclosed operations may be useful as applied to printers or other devices. For example, the disclosed processor, circuits or graphic processor(s) may process information and/or output information in any suitable color space including but not limited to Y,U,V, RGB, YPbPr or CMYK (cyan, magenta, yellow, black) color spaces. Suitable considerations should be taken into account when converting from RGB to CMYK or vice versa or between any two color spaces. For example, as is known, the ink type, paper type, brightness settings, and other factors should be considered in converting from or to RGB space and CMYK space as a color displayed on a display screen may be different from that output by a color printing operation.

The CMYK color space relates particularly to subtractive color technologies, where adding more color takes a pixel or dot closer to black, just as RGB relates to additive color technologies (where adding more color takes a pixel or dot closer to white). As such, if desired, pixel information, or dot color information, may be processed and/or output for any suitable display medium including electronic display screens or for printers on display medium such as paper, film or any other suitable article.

Figure 10:
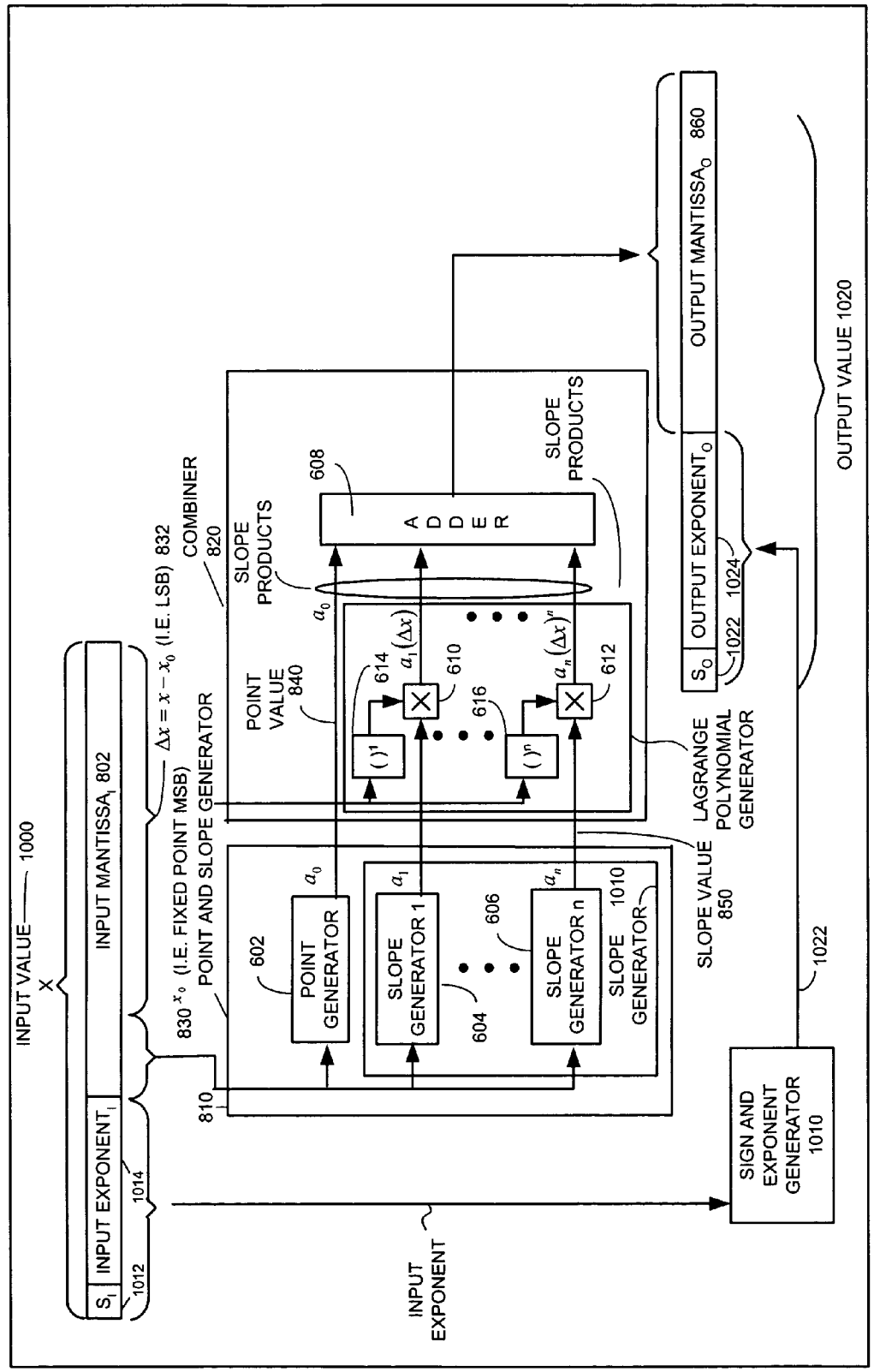
FIG. 10 is a block diagram of an apparatus to approximate a sine and/or cosine function in accordance with another embodiment of the present invention.

FIG. 10 illustrates the apparatus 800 previously described with regards to FIG. 6 further grouped into the point and slope generator 810 and the combiner circuit 820. Sign and exponent generator 1010 receives the sign input 1012 and the input exponent 1014 and in response produces a sign-out output 1022, and an output exponent 1024.

Figure 11:
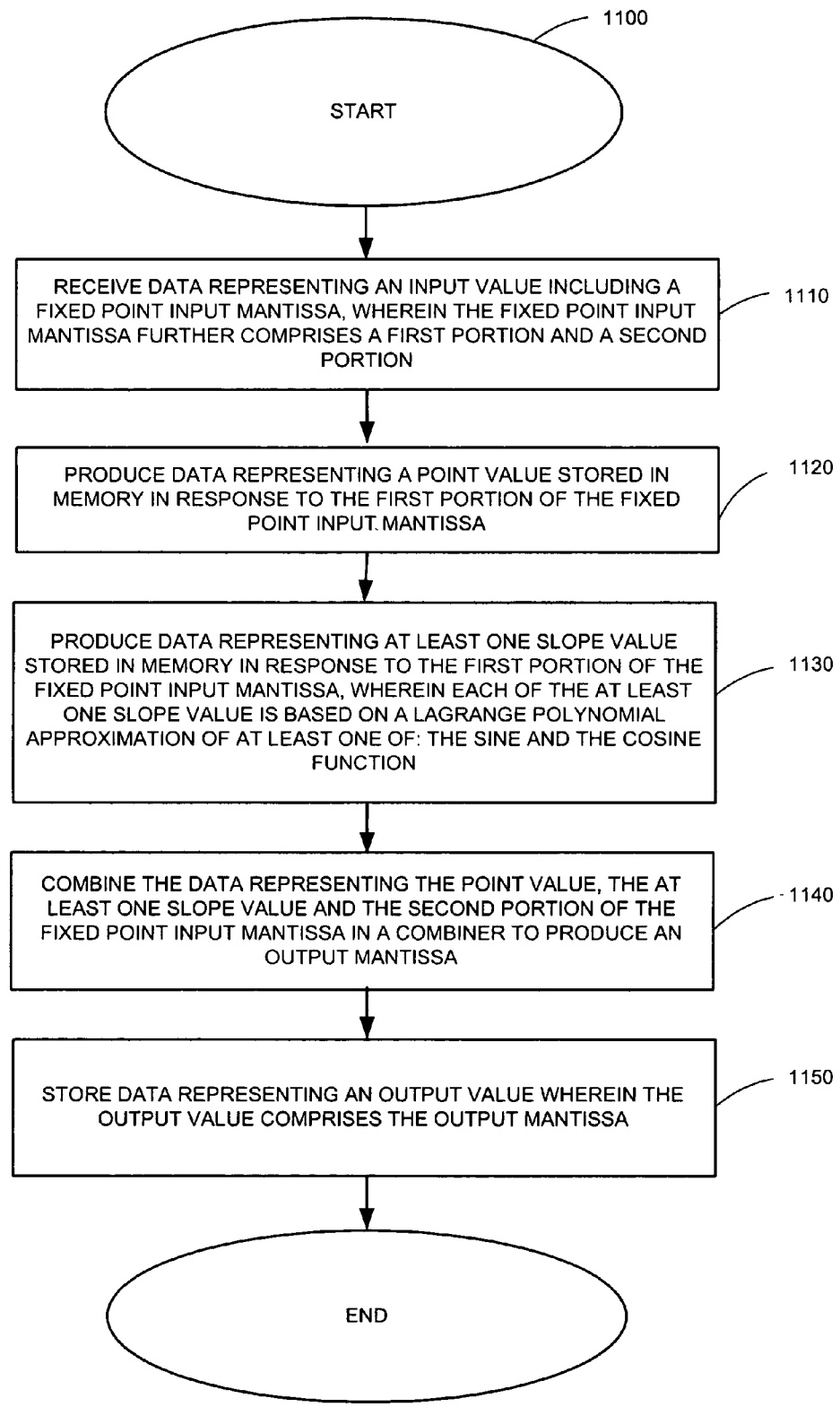
FIG. 11 is a flowchart for calculating the sine and cosine in accordance with one embodiment of the invention.

FIG. 11 illustrates a flow chart for a method to approximate the sine and/or the cosine function in the apparatus 800 such as is shown in FIGS. 8, 9 and 10. However, any suitable structure may be used. The method, although described as a series of operations and is shown to begin at block 1100, may begin at any point. Further, the operations may be performed in any suitable order and may be repeated in any suitable combination.

As shown in step 1110, the point and slope generator 810 receive data representing an input value 1000 including the fixed point input mantissa 802, wherein the data representing the fixed point input mantissa 830 further comprises the most significant bit portion $X_0$ and the least significant bit portion $\Delta x$ 832.

As shown in step 1120, the point and slope generator 810 produces data representing a point value 840 produced or alternatively stored in the point generator 602, such as a table in memory, in response to the most significant bit portion of the fixed point input mantissa 830.

As shown in step 1130, the point and slope generator 810 produces data representing at least one slope value 850 produced or alternatively stored in the slope generator 1010, such as a table in memory, in response to the first portion of the fixed point input mantissa. Each of the at least one slope values 850 is based on a LaGrange polynomial approximation of the sine and/or the cosine function.

As shown in step 1140, combiner 820 combines data representing the point value 840, the at least one slope value 850 and the least significant bit portion of the fixed point input mantissa 832 to produce data representing an output mantissa 860.

As shown in step 1150, the combiner 820 stores data representing an output value 1020 including the output mantissa 860. According to one embodiment, the combiner 820 also stores data representing the output exponent 1024 and the sign-out output 1022.

Figure 12:
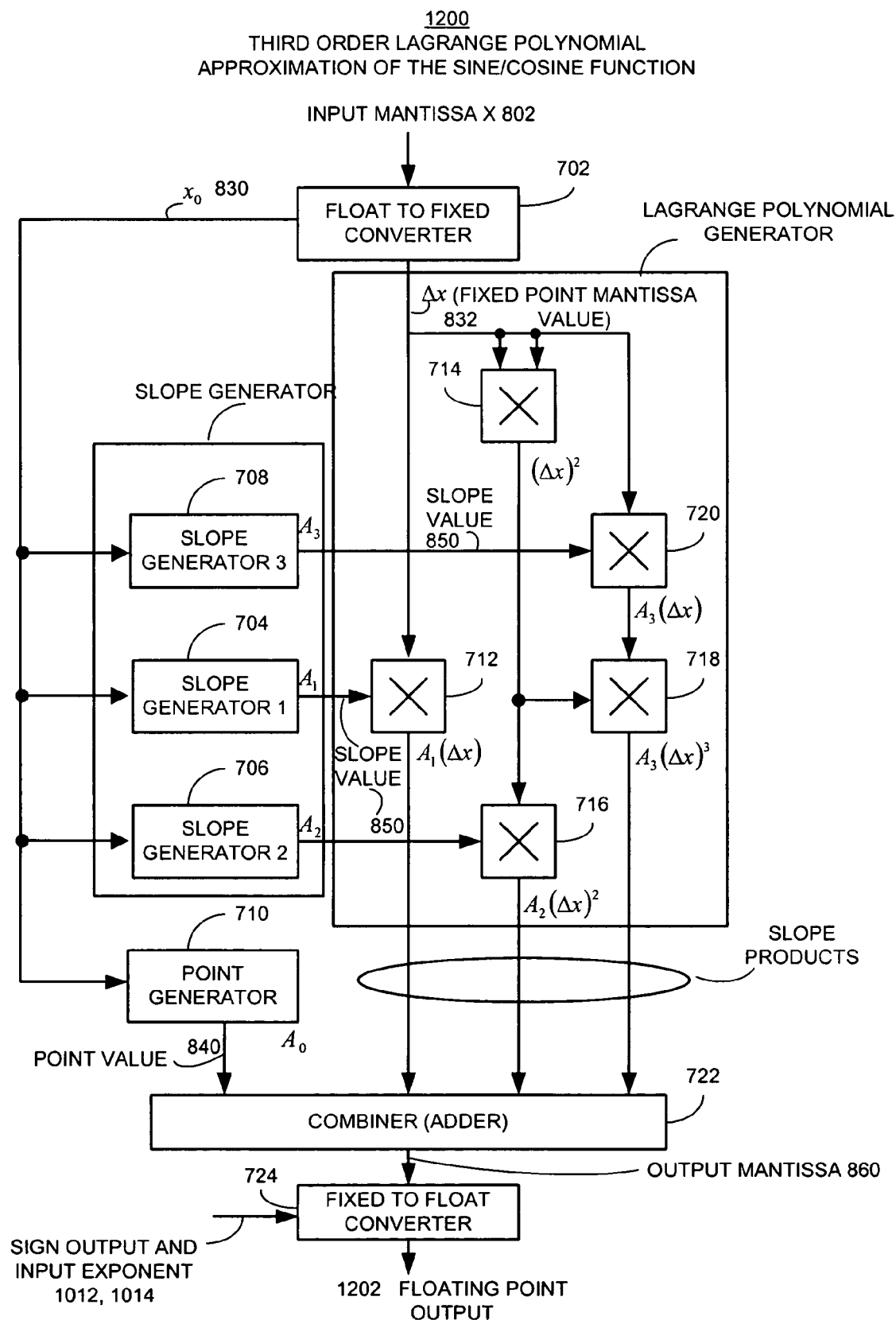
FIG. 12 is a block diagram illustrating a generalized technique for approximating function values in accordance with another embodiment of the present invention.

FIG. 12 is a block diagram of an apparatus 1200 for computing a sine and/or cosine function based on a third-order LaGrange polynomial approximation according to one embodiment of the invention. Although FIG. 12 is generally similar to the apparatus described in FIG. 7, the slope products Ai ($\Delta x$) are different. Note that the apparatus 1200 shown in FIG. 12, for ease of illustration, does not show any sign or exponent processing. Where an exponential function is being implemented, the data representing floating point input mantissa values 802 are first provided to a float-to-fixed conversion circuit 702, as is known in the art, to convert the input mantissa 802 from a floating point format to a fixed point format.

According to the embodiment shown, four generators 704-710 each containing 26 points, generate data representing values of the point value $f(x0)$, slopes A1, A2, and A3 for the sine function in the range of 0 to $\pi/4$ and four generators of similar size generate corresponding values for the cosine function in the same range. Generators 704-710 may be one or more suitably programmed processors having associated memory containing instructions which when executed, cause the operations described herein. According to an alternative embodiment, generators 704-710 may be implemented as a memory containing look-up tables as is known in the art.

The fixed point input mantissa $X_0$ 830 represent the upper 5 bits of which represent the points x0, x1, etc., and the lower bits represent $\Delta x$ 832. As described above, the output mantissa 860 is calculated by taking the 26-bit point function value $f(x0)$ and adding the three interpolation terms $A1*\Delta x$, $A2*\Delta x2$, and $A3*\Delta x3$. The three interpolation terms have a resolution of 20-bits, 16-bits, and 12-bits respectively and are aligned with the least significant bit of the point function value for the add. The resulting output mantissa 860 is a fractional value. The output mantissa 860 is normalized so the leading one is moved to the most significant bit position and then the floating point output exponent 1024 is calculated. The sign bit 1022 is set as shown in the table below. According to one embodiment, the mantissa, exponent and sign are combined and converted to IEEE biased single precision format, as is known in the art.

Figure 13:
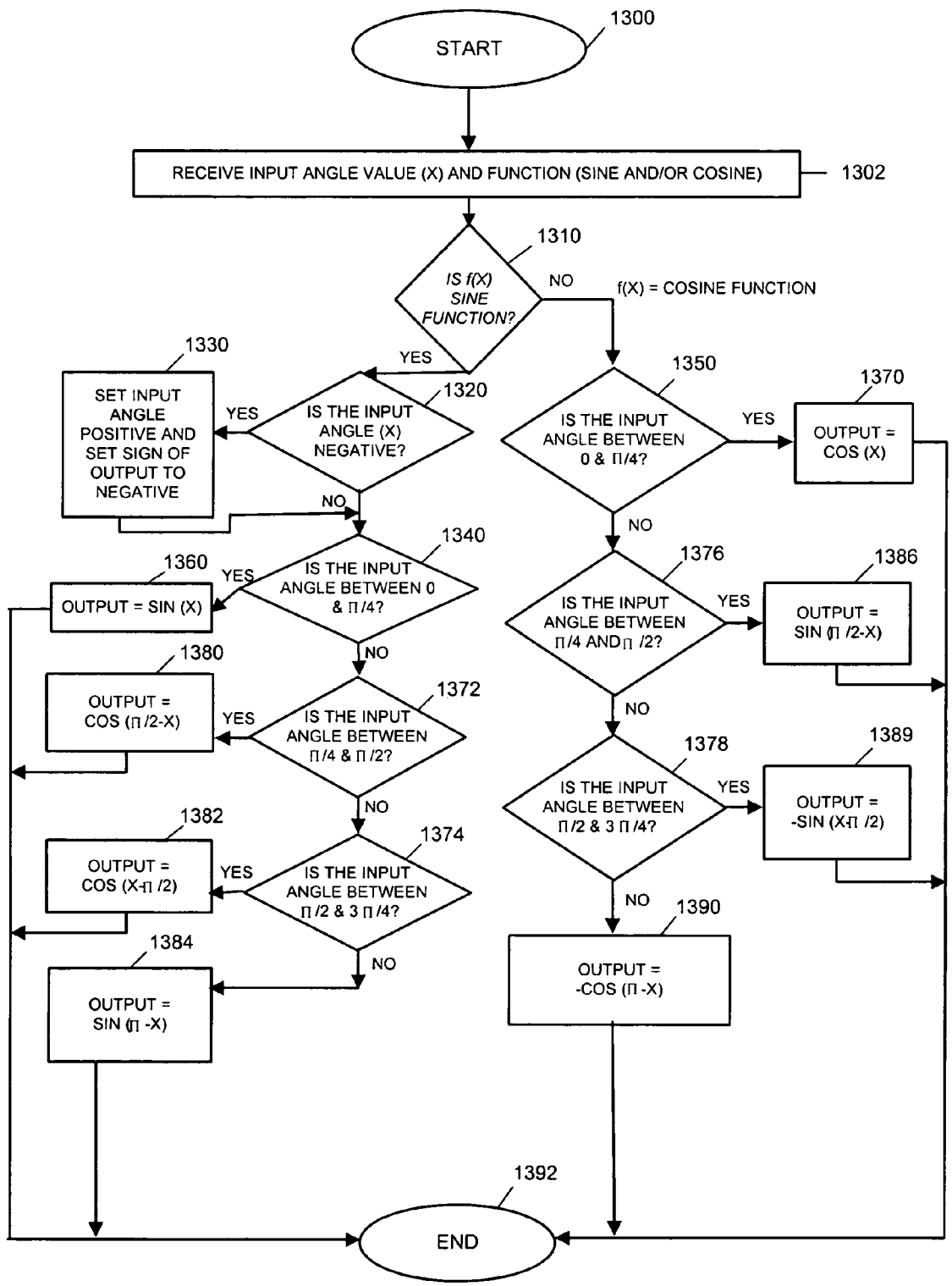
FIG. 13 is a flow chart for producing a fixed point input mantissa within a predefined range in accordance with one embodiment of the present invention.

FIG. 13 is a flow chart for producing a fixed point input mantissa 830 within a predefined range in accordance with one embodiment of the present invention. According to one embodiment, the float-to-fixed conversion circuit 702 insures that the fixed point input mantissa values 830 fall within a predefined valid range for the function being implemented. For example, the sine and/or cosine functions may be restricted to a range of 0 to $\pi/4$. It should be noted that the LaGrange polynomial for the sine function provides well ordered, stable and precise approximation from 0 to $\pi/4$. Additionally, within the range from 0 to $\pi/4$, the A values, $A_0$, $A_1$, $A_2$ and $A_3$ do not approach zero and therefore the LaGrange approximation within this input range provides a high level of precision. Further, the size of the table may be further reduced by limiting the input to 0 to $\pi/4$ rather than include entries from $-\pi$ to $\pi$. Using these table values as input to the equation P(x), the sine and cosine results for the range of $-\pi$ to $\pi$ are produced as follows.

| INPUT ($X_0$) Angle | EQUIVALENT Sin result | EQUIVALENT Cos result |
|---|---|---|
| 0 to $\pi/4$ | sin(x) | cos(x) |
| $\pi/4$ to $\pi/2$ | cos($\pi/2$ − x) | sin($\pi/2$ − x) |
| $\pi/2$ to $3\pi/4$ | cos(x − $\pi/2$) | −sin(x − $\pi/2$) |
| $3\pi/4$ to $\pi$ | sin($\pi$ − x) | −cos($\pi$ − x) |
| 0 to $-\pi/4$ | −sin(|x|) | cos(|x|) |
| $-\pi/4$ to $-\pi/2$ | −cos($\pi/2$ − |x|) | sin($\pi/2$ − |x|) |
| $-\pi/2$ to $-3\pi/4$ | −cos(|x| − $\pi/2$) | −sin(|x| − $\pi/2$) |
| $-3\pi/4$ to $-\pi$ | −sin($\pi$ − |x|) | −cos($\pi$ − |x|) |

The method shown in FIG. 13 is readily understood by one skilled in the art in view of the above table.

Figure 14:
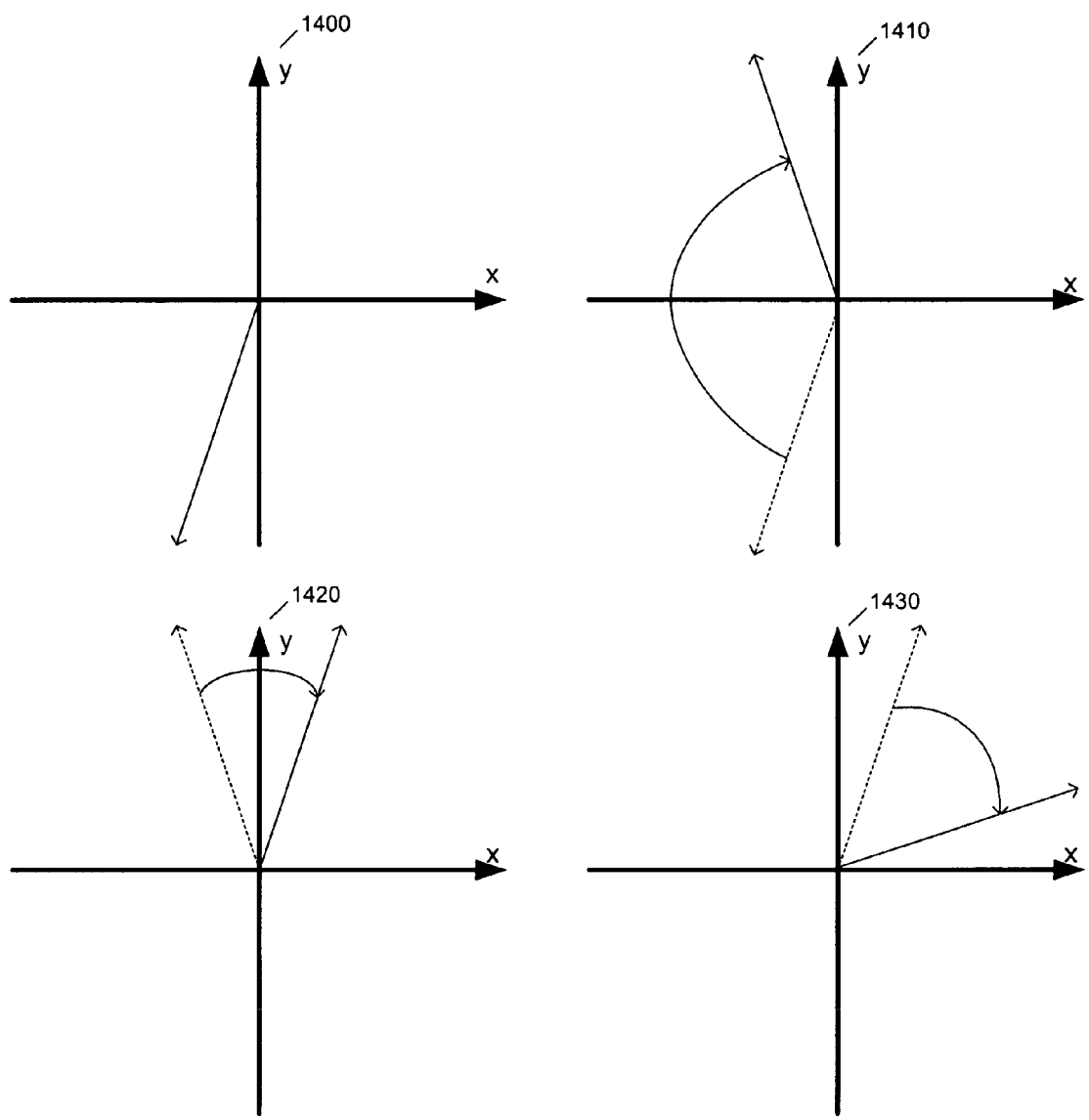
FIG. 14 is a graph illustrating the transformation of an input angle across the x and y axis to produce an input angle within a predefined range.

As shown in FIG. 14, the input angle 1400 is first transformed into the first quadrant (0 to $\pi/2$), first by mirroring it across the x axis if negative as shown in step 1410 and then across the y axis if greater than $\pi/2$, as shown in step 1420. If the resulting angle is then greater than $\pi/4$, the axis are exchanged, as shown in step 1430, so the final angle measures $\pi/4$ or less to the x axis and the function is changed from cosine to sine or sine to cosine. The actual transformation in the float to fixed converter occurs by observing which range the input angle represents and performing the subtraction indicated for that range as outlined in FIG. 13.

Among other advantages, one advantage of this method over the Taylor series implemented in the DirectX specification is greater precision. The maximum error of a Taylor series is given by the next term in the series beyond what is used for the approximation, resulting in approximately eight bits of precisions.

With a step size n of $2^{-5}$, max error for the approximation method described herein is: x=$1/24$ h4=$1/24(2^{-20})$= 0.0000000397 or 24 bits precision. According to one embodiment, either the sine or cosine is calculated in one clock cycle using a pipelined circuit with 5 multipliers and a 4-input adder. For comparison with the Taylor method described in the DirectX specification, the computations instead could be performed in an 8-clock macro in the following manner:

$$P(x)=f(x0)+(x-x0)(P1+(x-x0)(P2+(x-x0)P3))$$

The operation would start with an initial subtraction to find $\Delta x$, (x−x0), followed by three multiply-accumulate operations for each function. If the initial subtraction used to move the angle into the first quadrant is added, then there are two subtractions and six multiply accumulates to get both function results. This compares with the three multiply-accumulates, three multiplies, and two adds needed for the Taylor method described in the DirectX specification.

The present invention substantially overcomes the limitations of prior art techniques for approximating function output values. To this end, a simplified form of LaGrange polynomials for approximating the sine and cosine functions are used, which provides greater accuracy for a variety of functions using a single set of implementation hardware. As a result, a cost benefit is realized because different functions may be implemented using the same hardware, while still achieving the same or better accuracy.

The foregoing description of a preferred embodiment of the invention has been presented for purposes of illustration and description; it is not intended to be exhaustive or to limit invention to the precise form disclosed. The description was selected to best explain the principles of the invention and practical application of these principles to enable others skilled in the art to best utilize the invention and various embodiments, and various modifications as are suited to the particular use contemplated. For example, arithmetic functions other than those listed above may be implemented in accordance with the present invention. Thus, it is intended that the scope of the invention not be limited by the specification, but be defined by the claims set forth below.

I claim:

1. An apparatus operative to approximate at least one of: a sine and cosine function, the apparatus comprising:
    a point and slope generator operative to receive data representing an input value including a fixed point input mantissa having a first bit portion and a second bit portion, and in response, to produce data representing at least one point value and at least one slope value based on the first bit portion of the fixed point input mantissa, wherein the data representing the at least one slope value is based on a LaGrange polynomial approximation of the at least one of: the sine and the cosine function;
    a combiner operatively coupled to the point and slope generator and operative to produce data representing an output mantissa and store the output mantissa in memory in response to the data representing the point value, the at least one slope value and the second bit portion of the fixed point input mantissa; and
    processing circuitry operative to process the output mantissa value to produce data for display.

2. The apparatus of claim 1, wherein the data representing the input value further includes data representing an input exponent, the apparatus further includes:
    a floating point to fixed point converter, operatively coupled to the point and slope generator and the combiner, and operative to receive the data representing the input value to denormalize the input value to produce the data representing the fixed point input mantissa.

3. The apparatus of claim 2, wherein the floating point to fixed point converter is operative to produce data representing the fixed point input mantissa within a predefined range.

4. The apparatus of claim 3, wherein the predefined range for the data representing the fixed point input mantissa is 0 to $\pi/4$.

5. The apparatus of claim 2, further comprising:
    a fixed point to floating point converter, operatively coupled to the combiner, and operative to receive the data representing the output mantissa and an unbiased version of the input exponent, to convert the data representing the output mantissa and the unbiased version of the input exponent from a fixed-point to a floating-point format.

6. The apparatus of claim 1, wherein the point and slope generator and the combiner are operative to produce the data representing the output mantissa according to:

$$\hat{f}(x) = f(x_0) + \sum_{i=1}^{N} a_i(\Delta x)^i$$

where: $\hat{f}(x)$ is the data representing the output mantissa;
$x_0$ is a value of the first bit portion of the fixed point input mantissa;
$f(x_0)$ is the point value;
$\Delta x$ is a value of the second bit portion of the fixed point input mantissa;
$a_i(\Delta x)^i$ is an i'th slope product of the at least one slope product; and
N is an order of the LaGrange polynomial approximation of the at least one of: the sine and the cosine function.

7. The apparatus of claim 6, wherein N=3 and the LaGrange polynomial approximation of the at least one of: the sine and the cosine function comprises a third-order LaGrange polynomial.

8. An apparatus operative to approximate at least one of: a sine and cosine function, the apparatus comprising:
a point generator operative to receive data representing an input value including a fixed point input mantissa, wherein the fixed point input mantissa further comprises a first bit portion and a second bit portion, and in response produce data representing at least one point value in response to the first bit portion of the fixed point input mantissa;
at least one slope generator operative to provide data representing at least one slope value based on the first bit portion of the fixed point input mantissa;
a Lagrange polynomial generator, operatively coupled to the slope generator and the point generator, and operative to receive data representing the at least one slope value and the second bit portion of the fixed point fixed point input mantissa and in response to produce at least one slope product in accordance with a LaGrange polynomial approximation of at least one of: a sine and a cosine function;
an adder, operatively coupled to the Lagrange polynomial generator and the point generator, and operative to combine the point value and the at least one slope product and in response to produce the data representing the output mantissa and store data representing an output value in memory wherein the data representing the output value includes the output mantissa; and
processing circuitry operative to process the output value to produce data for display.

9. The apparatus of claim 8, wherein the data representing the input value further includes an input exponent, the apparatus circuit further comprising:
a floating point to fixed point converter, operatively coupled to the point generator, the slope generator and the Lagrange polynomial generator, and operative to convert the data representing the input value from a floating format to produce the fixed point input mantissa.

10. The apparatus of claim 9, wherein the apparatus is operative to: process the data representing the input value such that the fixed point input mantissa is within a predefined range.

11. The apparatus of claim 9, wherein the predefined range for the fixed point input mantissa is 0 to π/4.

12. The apparatus of claim 8, wherein the data representing the output value further includes data representing an output exponent, the apparatus further comprising:
a fixed point to floating point converter operative to receive the data representing the output mantissa and the input exponent and in response to produce data representing a fixed point output mantissa wherein the data representing the output value includes the fixed point output mantissa and a shift amount; and
a sign and exponent generator, operatively coupled to the fixed point to floating point converter, and operative to receive the data representing the shift amount and in response produce the data representing the output exponent.

13. The apparatus of claim 8, wherein the apparatus is further operative to calculate the data representing the output mantissa according to:

$$\hat{f}(x) = f(x_0) + \sum_{i=1}^{N} a_i(\Delta x)^i$$

where: $\hat{f}(x)$ is the output mantissa;
$x_0$ is a value of the first bit portion of the fixed point fixed point input mantissa;
$f(x_0)$ is the point value;
$\Delta x$ is a value of the second bit portion of the fixed point input mantissa;
$a_i$ is an i'th slope value of data representing the at least one slope value; and
N is a third order of the LaGrange polynomial approximation of the at least one of: the sine and the cosine function.

14. An apparatus operative to approximate at least one of: a sine and cosine function, the apparatus comprising:
memory containing data representing at least one point value and at least one slope value and instructions executable by a processor that cause the processor to:
receive data representing an input value including a fixed point input mantissa, wherein the fixed point input mantissa further comprises a first bit portion and a second bit portion;
produce the data representing the point value in response to the data representing the first bit portion of the fixed point input mantissa;
produce the data representing at least one slope value in response to the data representing the first bit portion of the fixed point input mantissa, wherein the data representing the at least one slope value is based on a LaGrange polynomial approximation of at least one of: the sine and the cosine function;
combine the data representing the point value, the at least one slope value and the second bit portion of the fixed point input mantissa to produce data representing the output mantissa;
store data representing an output value in memory wherein the output value includes the output mantissa; and
processing circuitry operative to process the output value to produce data for display.

15. The apparatus of claim 14, wherein the graphics processor is operative to:
convert the data representing the input value from a floating format to produce the fixed point input mantissa.

16. The apparatus of claim 14, wherein the processor is operative to produce the fixed point input mantissa within a predefined range.

17. The apparatus of claim 16, wherein the predefined range for the fixed point input mantissa is 0 to $\pi/4$.

18. The apparatus of claim 14, wherein the processor is operative to convert the data representing the output value from a fixed format to a floating point format.

19. A method to approximate at least one of: a sine and a cosine function in a graphics processing circuit, the method comprising:
    receiving data representing an input value including a fixed point input mantissa, wherein the fixed point input mantissa further comprises a first bit portion and a second bit portion;
    producing data representing a point value stored in memory in response to the first bit portion of the fixed point input mantissa;
    producing data representing at least one slope value stored in memory in response to the first bit portion of the fixed point input mantissa, wherein the data representing the at least one slope value is based on a LaGrange polynomial approximation of at least one of: the sine and the cosine function;
    combining the data representing the point value, the at least one slope value and the second bit portion of the fixed point input mantissa in a combiner to produce data representing an output mantissa;
    storing data representing an output value wherein the data representing the output value comprises the output mantissa; and
    processing the output value to produce data for display.

20. The method of claim 19, wherein the data representing the input value further includes an input exponent and the data representing the output value further includes an output exponent, the method further including:
    processing the data representing the output mantissa according to the at least one of: the sine and the cosine function to provide the output exponent; and
    combining the output mantissa and the output exponent to provide the data representing the output value.

21. The method of claim 19, further comprising a step of:
    converting the data representing the input value such that the fixed point input mantissa is within a predefined range.

22. The method of claim 21, wherein the predefined range for the data representing the fixed point input mantissa is 0 to $\pi/4$.

23. The method of claim 19, wherein combining further comprises calculating the data representing the output mantissa according to:

$$\hat{f}(x) = f(x_0) + \sum_{i=1}^{N} a_i(\Delta x)^i$$

where: $\hat{f}(x)$ is the data representing the output mantissa;
    $x_0$ is a value of the first bit portion of the fixed point fixed point input mantissa;
    $f(x_0)$ is the point value;
    $\Delta x$ is a value of the second bit portion of the fixed point input mantissa;
    $a_i$ is an i'th slope value of data representing the at least one slope value; and
    N is an order of the LaGrange polynomial approximation of the at least one of: the sine and the cosine function.

24. The method of claim 23, wherein N=3 and the LaGrange polynomial approximation of the at least one of: the sine and the cosine function comprises a third-order LaGrange polynomial approximation of the at least one of: the sine and the cosine function.

25. The method of claim 23, further comprising steps of: deriving the data representing the at least one slope value, $a_i$, by factoring the LaGrange polynomial approximation of the at least one of: the sine and the cosine function by $(\Delta X)^i$.

26. Memory containing instructions executable by one or more processors that causes the one or more processors to:
    receive data representing an input value including a fixed point input mantissa, wherein the fixed point input mantissa further comprises a first bit portion and a second bit portion;
    produce data representing a point value in response to the first bit portion of the fixed point input mantissa;
    produce data representing at least one slope value stored in the memory in response to the first bit portion of the fixed point input mantissa, wherein the data representing at least one slope value is based on a LaGrange polynomial approximation of at least one of: the sine and the cosine function;
    combine the data representing the point value, the data representing the at least one slope value and the second bit portion of the fixed point input mantissa to produce data representing an output mantissa; and
    process the output value to produce data for display.

27. The memory of claim 26 containing executable instructions that causes the one or more processing devices to:
    denormalize the data representing the input value to produce the fixed point input mantissa, wherein the data representing the input value further includes an input exponent.

* * * * *